O. WELLS.
Coupling for the Joints of Logs

No. 205,709.                    Patented July 2, 1878.

Attest.
F. H. Schott.
Fred E. Tasker.

Inventor:
Osbern Wells
by J. C. Tasker & Co.
atty

UNITED STATES PATENT OFFICE.

OSBORN WELLS, OF NEWBERRY, SOUTH CAROLINA.

IMPROVEMENT IN COUPLINGS FOR THE JOINTS OF LOGS.

Specification forming part of Letters Patent No. 205,709, dated July 2, 1878; application filed June 22, 1878.

*To all whom it may concern:*

Be it known that I, OSBORN WELLS, of Newberry, in the county of Newberry and State of South Carolina, have invented certain new and useful Improvements in Couplings for the Joints of Logs; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to furnish a cheap and perfect coupling for the joints of logs used for the purpose of conveying water and other fluids; and the invention consists in a metallic union piece or coupling of peculiar construction, which will be first fully described, and then specifically claimed.

Figure 1:
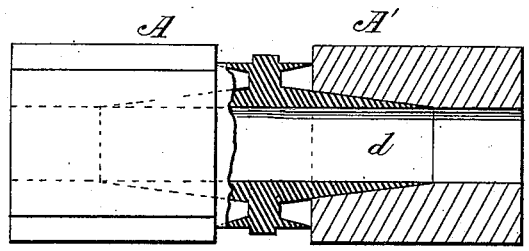
Figure 2:
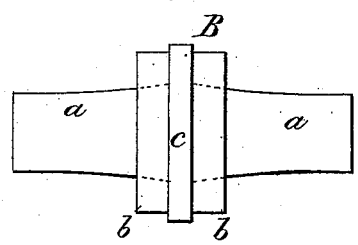
Figure 3:
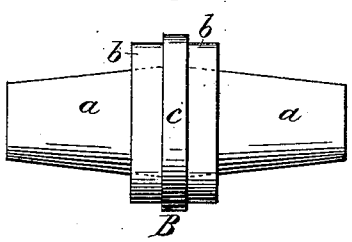

In the drawings, Figure 1 shows the ends of two logs, one of which, together with one end of the coupling, is shown in section. Figs. 2 and 3 present side views of the coupling of slightly different form in that part which enters the end of the log.

This coupling is preferably constructed of cast metal, and is represented in the drawings by the letter B. Throughout its length is an axial bore or hole, $d$, of the same or nearly the same diameter as that bored in the logs A A'. A central flange, $c$, surrounds the coupling, being of considerably greater diameter than its socket-pieces $a$, which extend in opposite directions from it. This flange is provided with two annular projecting lips, $b$, which are brought to a sharp edge, so that when the two logs into which the coupling is inserted, and which it is destined to connect, are forced together, these lips will enter their ends.

Surrounding the bore $d$, and extending each way from the flange $c$, are the two socket ends or pieces $a\ a$. These sockets are tapered from an edge at their extreme ends to a considerable thickness near the middle, where they unite with the flange. This taper may be a true and straight one, as shown in Figs. 1 and 3, or it may be of slightly curved longitudinal outline, as seen in Fig. 2.

If the couplings are formed of cast-iron or other easily oxidized metal, it is desirable to give them a coating of tin, zinc, or other non-oxidizable material in order to preserve them from rust, to which they are peculiarly liable, and also to prevent the water passing through them becoming impregnated with chalybeate properties. In using these couplings the ends of the logs, either before or after being bored, are cut square, when, if the socket-pieces have a straight taper, the holes may be slightly reamed; but if of the form shown in Fig. 2, such reaming will be unnecessary. The coupling is then placed between any two logs which it is desired to connect, its socket-pieces slightly entering their bore. The logs are then forced together by driving upon the end of one of them with a maul or heavy hammer. This causes the socket-pieces to enter the bore, while the annular lips $b$ enter the wood at a short distance outside of them, compressing the wood between the lips and socket-pieces, thus forming a perfectly tight joint, and at the same time preventing all danger of splitting the ends of the logs by the tapering socket-pieces being driven into them.

Having thus described my invention, I claim as new, and desire to secure by Letters Patent, the following:

A metallic joint-coupling consisting of the tapered socket-pieces, their encircling flange, and the sharp-edged annular lips, all constructed substantially as herein shown and described, and for the purpose set forth.

In testimony that I claim the foregoing as my own I hereunto affix my signature in presence of two witnesses.

OSBORN WELLS.

Witnesses:
FRED. E. TASKER,
E. A. DICK.